US 8,498,596 B2

(12) United States Patent
Popescu

(10) Patent No.: US 8,498,596 B2
(45) Date of Patent: Jul. 30, 2013

(54) FM SIGNAL QUALITY MEASUREMENT

(75) Inventor: Andrei Barbu Popescu, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 798 days.

(21) Appl. No.: 12/517,640

(22) PCT Filed: Nov. 29, 2007

(86) PCT No.: PCT/GB2007/004586
§ 371 (c)(1),
(2), (4) Date: Dec. 9, 2009

(87) PCT Pub. No.: WO2008/071909
PCT Pub. Date: Jun. 19, 2008

(65) Prior Publication Data
US 2010/0151807 A1    Jun. 17, 2010

(30) Foreign Application Priority Data
Dec. 14, 2006 (GB) .................................. 0624982.5

(51) Int. Cl.
*H04B 17/00* (2006.01)
(52) U.S. Cl.
USPC .................. 455/226.1; 455/226.2; 455/226.3; 455/150.1; 455/230
(58) Field of Classification Search
USPC ............... 455/222, 226.1, 226.2, 226.3, 227, 455/230, 277.2, 135
See application file for complete search history.

(56) References Cited

U.S. PATENT DOCUMENTS

| | | | |
|---|---|---|---|
| 3,560,653 A | 2/1971 | Dias | |
| 4,034,299 A | 7/1977 | Cho et al. | |
| 4,121,254 A * | 10/1978 | Morita et al. | 455/192.3 |
| 4,792,991 A | 12/1988 | Eness | |
| 4,893,349 A * | 1/1990 | Eastmond et al. | 455/205 |
| 5,027,402 A | 6/1991 | Richards, Jr. et al. | |
| 5,073,976 A * | 12/1991 | Kennedy | 455/161.3 |
| 5,125,105 A * | 6/1992 | Kennedy et al. | 455/164.1 |
| 5,134,708 A * | 7/1992 | Marui et al. | 455/421 |
| 5,416,843 A | 5/1995 | Hopkins | |
| 5,587,717 A * | 12/1996 | Jang | 342/359 |
| 5,710,995 A * | 1/1998 | Akaiwa et al. | 455/277.2 |

(Continued)

FOREIGN PATENT DOCUMENTS

| | | |
|---|---|---|
| EP | 0543396 | 5/1993 |
| EP | 1585225 A2 | 10/2005 |
| JP | 2002-237757 | 8/2002 |

OTHER PUBLICATIONS

European Examination Report dated Sep. 6, 2010 for European Patent Application No. 07824754.1.
Foreign Office Action for Japanese Patent Application No. 2009-540836 mailed Aug. 20, 2010.
Partial English translation of Foreign Office Action for Japanese Patent Application No. 2009-540836 mailed Aug. 20, 2010.

(Continued)

*Primary Examiner* — Duc M Nguyen
(74) *Attorney, Agent, or Firm* — Fulbright & Jaworski LLP

(57) ABSTRACT

A signal quality estimator for estimating the quality of signal reception in a signal receiver, the signal quality estimator comprising: a first filter for filtering a signal received by the receiver to isolate a frequency band therein; and a signal analyzer for forming an indication of the degree to which the amplitude of the signal in that frequency band varies over time, to serve as an estimate of the quality of signal reception in the receiver.

21 Claims, 1 Drawing Sheet

U.S. PATENT DOCUMENTS

| | | | | |
|---|---|---|---|---|
| 5,937,332 A * | 8/1999 | Karabinis | .................... | 455/12.1 |
| 6,618,453 B1 * | 9/2003 | Lundby | ......................... | 375/346 |
| 7,209,709 B2 * | 4/2007 | Miyazaki et al. | ........... | 455/67.11 |
| 7,313,400 B2 * | 12/2007 | Moon et al. | ................... | 455/450 |
| 8,014,741 B2 * | 9/2011 | Barnhill | .................... | 455/226.1 |
| 2005/0220056 A1 * | 10/2005 | Itoh | ............................. | 370/332 |
| 2007/0071145 A1 * | 3/2007 | Perets | .......................... | 375/346 |
| 2007/0223707 A1 * | 9/2007 | Chen | ............................... | 381/12 |
| 2009/0079656 A1 * | 3/2009 | Peyla et al. | .................. | 343/860 |

OTHER PUBLICATIONS

International Search Report for PCT/GB2007/004586.

Written Opinion of the International Searching Authority for PCT/GB2007/004586.

European Patent Office; European Examination Report dated Oct. 29, 2012 for European Patent Application No. 07824754.1; 4 pages; Europe.

* cited by examiner

FM SIGNAL QUALITY MEASUREMENT

CROSS REFERENCE TO RELATED APPLICATIONS

This application is a 35 U.S.C. §371 national phase application of PCT International Application No. PCT/GB2007/004586, filed Nov. 29, 2007, by applicant Cambridge Silicon Radio Limited, entitled "FM SIGNAL QUALITY MEASUREMENT," which claims priority to United Kingdom Application No. GB 0624982.5, filed Dec. 14, 2006, each of the foregoing of which is incorporated herein by reference in its entirety.

FIELD OF THE TECHNOLOGY

This disclosure relates to measuring the quality of received FM (frequency modulation) signals.

BACKGROUND

Conventional FM broadcast radio signals are transmitted according to a standardized scheme. Mono FM broadcast signals are modulated by an audio signal with 15 kHz bandwidth. This is known as the M signal. The modulating signal of stereo FM broadcasts additionally contains a pilot signal at 19 kHz and a second signal representing the difference between the left and right stereo channels which is transmitted as a double-sideband suppressed carrier (DSBSC) signal in the range from 23 kHz to 53 kHz. This second signal is known as the S signal. In generating stereo signals for transmission, the M, S and pilot signals are combined producing a signal known as the stereo multiplex, and then frequency modulated. Signals carrying other information, such as RDS, RBDS, ARI and subsidiary communications may also be added to a stereo multiplex. For mono reception only the M signal needs to be received. For stereo reception the left and right stereo channels are recovered by combining the M and S signals. The pilot signal aids the receiver to perform separation of the stereo multiplex components.

When an FM signal is to be received and decoded for reproduction, it is frequency demodulated to yield the stereo multiplex signal. If the FM signal is transmitted as a stereo signal then the stereo multiplex contains the M, S and pilot signals. If the FM signal is transmitted as a mono signal then the stereo multiplex contains the M signal but it does not contain the S and pilot signals. Nowadays most FM radio stations transmit stereo broadcasts. The structure of the stereo multiplex for a stereo FM broadcast signal is illustrated in FIG. 1.

For various reasons it might be desirable for the receiver to have a measure of the quality of the received signal. For example, when a single radio station is broadcast on two FM channels it may be useful for the receiver to switch automatically to the channel that can be received with better quality. To achieve this, the receiver must be able to compare the receive quality of those two channels. Another use for a quality measure is to provide the input to a quality meter for providing an indication of receive quality to a user of the receiver.

A conventional way to assess received FM signal quality is by taking received signal strength as a measure of received signal quality. However, this approach can not detect signal impairments that do not affect the signal's strength, such as interference and distortion.

There is therefore a need for an improved method for estimating the signal quality of received FM radio signals.

SUMMARY

According to the present disclosure from one aspect there is provided a signal quality estimator for estimating the quality of signal reception in a signal receiver, the signal quality estimator comprising: a first filter for filtering a signal received by the receiver to isolate a frequency band therein; and a signal analyzer for forming an indication of the degree to which the amplitude of the signal in that frequency band varies over time, to serve as an estimate of the quality of signal reception in the receiver.

The signal analyzer may comprise: an amplitude estimator for forming an estimate of the time-variance of the amplitude of the signal in the frequency band; and a signal estimator for forming the said indication in dependence on the magnitude of the estimate formed by the amplitude estimator.

The amplitude estimator may comprise: an amplitude detector for detecting the time-variant amplitude of the signal in the frequency band; and a second filter for filtering time-constant components from the output of the amplitude detector so as to form the estimate of the time-variance of the amplitude of the signal in the frequency band.

The amplitude detector may operate periodically to set the value of its output to be representative of the maximum amplitude of the signal in the frequency band during a preceding period.

The amplitude detector may be a peak detector.

The second filter may be a high-pass filter.

The signal estimator may be arranged to form the said indication in dependence on the average magnitude of the estimate formed by the amplitude estimator.

The signal estimator may be or comprise a rectifier followed by a low-pass filter.

The said frequency band preferably includes 19 kHz. The first filter preferably has a 3 dB bandwidth of less than 100 Hz, and more preferably less than 50 or 20 Hz.

According to the present disclosure from a second aspect there is provided a signal receiver comprising a signal quality estimator for estimating the quality of signal reception in the receiver, the signal quality estimator comprising: a first filter for filtering a signal received by the receiver to isolate a frequency band therein; and a signal analyzer for forming an indication of the degree to which the amplitude of the signal in that frequency band varies over time, to serve as an estimate of the quality of signal reception in the receiver.

The receiver may comprise: a frequency demodulator for frequency demodulating a received signal to form a demodulated signal, and wherein the first filter takes the demodulated signal as its input.

The signal receiver may comprise a signal recovery unit for recovering a traffic signal from the demodulated signal, the signal recovery unit being arranged to recover the traffic signal by means of a pilot signal passed in the said frequency band.

The signal receiver may be an FM broadcast radio receiver.

According to a third aspect of the present disclosure there is provided a method for estimating the quality of signal reception in a signal receiver, the method comprising: filtering a signal received by the receiver to isolate a frequency band therein; and forming an indication of the degree to which the amplitude of the signal in that frequency band varies over time, to serve as an estimate of the quality of signal reception in the receiver.

The step of forming an indication of the degree to which the amplitude of the signal in that frequency band varies over time may comprise: forming an estimate of the time-variance of the amplitude of the signal in the frequency band; and forming the said indication in dependence on the magnitude of the estimate formed by the amplitude estimator.

The step of forming an estimate of the time-variance of the amplitude of the signal in the frequency band may comprise: detecting the time-variant amplitude of the signal in the frequency band; and filtering time-constant components from the output of the amplitude detection step so as to form the estimate of the time-variance of the amplitude of the signal in the frequency band.

The step of detecting the time-variant amplitude of the signal in the frequency band may comprise periodically setting the value the output of the amplitude detection step to be representative of the maximum amplitude of the signal in the frequency band during a preceding period.

The method may comprise forming the said indication in dependence on the average magnitude of the estimate formed by the amplitude estimator.

BRIEF DESCRIPTION OF THE DRAWINGS

The present disclosure will now be described by way of example with reference to the accompanying drawing.

In the drawing.

DETAILED DESCRIPTION

The quality measure described herein is a function of the amount of amplitude variation of the signal present in a relatively narrow band centered on 19 kHz in the stereo multiplex signal. Preferably the quality measure is proportional to that amount as measured according to a suitable mechanism, examples of which are described below.

Figure 1:
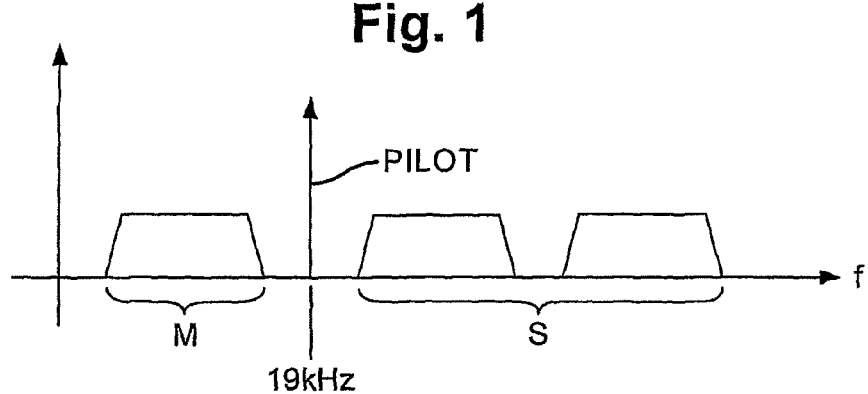
FIG. 1 shows the structure of the stereo multiplex for conventional FM broadcast signals.
Figure 2:
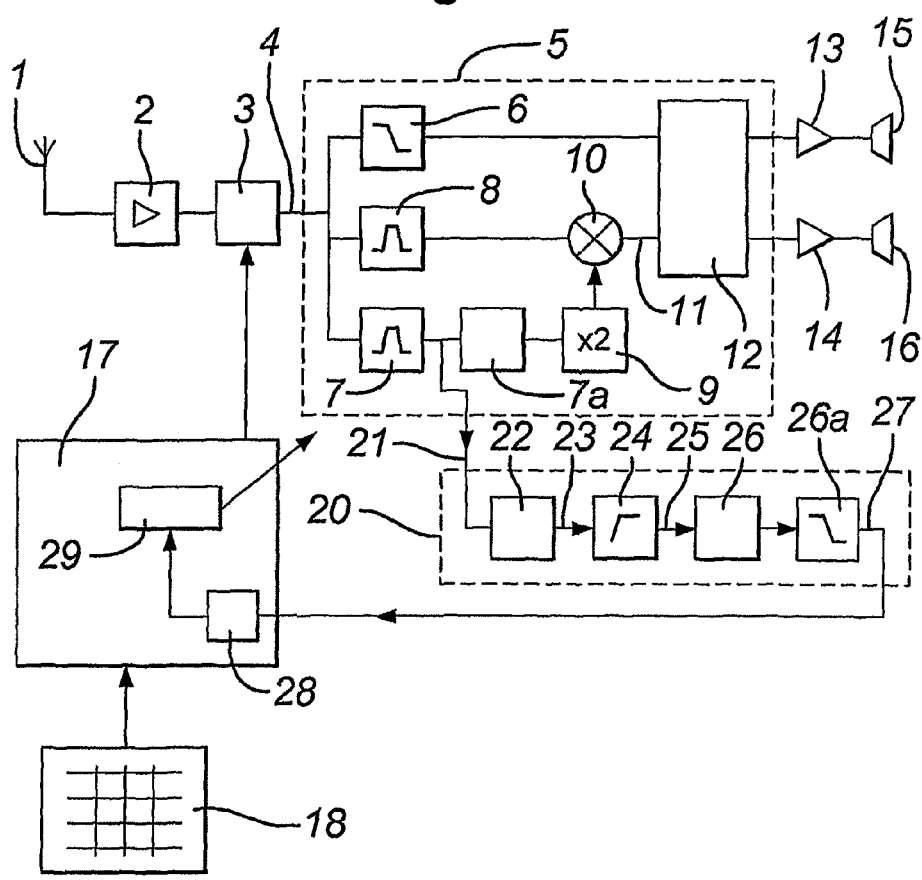
FIG. 2 is a schematic diagram of an example of an FM receiver.

FIG. 2 illustrates a receiver for FM broadcast signals. The signals are received at an antenna 1, amplified by amplifier 2 and then FM demodulated by demodulator 3. The signal at point 4, at the output of the demodulator, is the stereo multiplex signal, which contains the M signal and for a stereo broadcast the S and pilot signals, as illustrated in FIG. 1.

For recovery of the audio components of the signal, the M, S and pilot signals pass to an audio recovery section 5. At the input of the audio recovery section, the M, S and pilot signals are isolated from the stereo multiplex by means of filters 6, 8 and 7. Filter 6 is a low-pass filter having a cut-off frequency at 15 kHz, which passes only the M signal. Filter 7 is a band-pass filter centered on 19 kHz, which passes only the pilot signal. Filter 8 is a band-pass filter that passes only the 23 to 53 kHz S signal. The recovered pilot signal passes to a frequency doubler 9. The frequency doubler generates a 38 kHz signal which is mixed with the S signal in mixer 10 to shift the S signal to baseband, forming a signal at 11 that represents the difference between the left and right stereo channels. The M signal and the signal at 11 pass to unit 12 which generates the left and right stereo channels by combining the M signal and the signal at 11. These can be output to amplifiers 13, 14 and loudspeakers 15, 16.

In some implementations filter 7 may incorporate an optional phase locked loop 7a (as shown in FIG. 2), in order to improve the quality of the recovered pilot signal. Further, filter 8 may be located at the output of the mixer 10 and implemented as a low-pass filter similar to filter 6.

The receiver has a control unit 17 which controls its operation. For example, control unit 17 is responsive to a keypad 18 by which a user can indicate the channel that is to be received. In dependence on that input the control unit sets the FM demodulator 3 accordingly.

Section 20 is intended for assessing the quality of the received signal.

Section 20 takes as its input the isolated pilot signal as output from filter 7. For this purpose the filter 7 is preferably selected to be relatively narrow, and centered on the frequency of the pilot signal. In the case of conventional broadcast FM signals the filter 7 could be centered on 19 kHz and could have a 3 dB bandwidth of around 10 Hz and a stop-band attenuation of 60 dB at frequencies more than 3 kHz away from 19 kHz.

The isolated pilot signal at 21 is input to an amplitude detector 22. This produces an output signal at 23 that represents the amplitude of the signal at 21. The amplitude detector may periodically measure the amplitude of the signal at 21, over sample periods of $t_{samp}$. This is particularly convenient in a digital processing implementation. $t_{samp}$ is preferably selected such that the sampling frequency, $1/t_{samp}$, is less than the frequency of the pilot signal. The output of the amplitude detector is preferably an analog signal whose value during any sample period is representative of the maximum amplitude of the signal at 21 during the previous sample period. It could be representative of other functions of the amplitude during that period, such as the average amplitude. Most preferably the output of the amplitude detector is equal to or proportional to the maximum amplitude of the signal at 21 during the immediately previous sample period. Other methods of estimating the amplitude of the signal at 21 could be used: for example the signal at 23 could be formed so as to have a level that follows the level of the signal at 21 as the latter increases above the level of the signal at 23, but that otherwise decays over time. The estimate of the amplitude of the signal at 21 could be formed digitally if required.

The signal at 23 that is output from the amplitude detector is input to a high-pass filter 24 which rejects the DC component of the signal at 23 to form an output at 25. In a digital processing implementation, the z transform of filter 24 may, for example, be $H(z)=1-1/z$. The effect of the filter 24 is to make the signal at 25 independent of the magnitude of any constant amplitude tone that may be present in the signal at 21. An example of such a constant amplitude tone is—in normal reception conditions—the pilot tone itself, so the filter 24 has the effect of removing the influence of the pilot tone itself from the signal at 25. Again, this step may be performed digitally if that is preferred.

The quality measure is taken to be dependent on the average power of the signal at 25. The higher the average power of the signal at 25, the lower the signal quality is. The dependency may take any suitable form, but most preferably the dependency is such that the quality measure is representative of the RMS (root mean square) of the power of the signal at 25. This may be determined in a number of ways. One convenient mechanism is to pass the signal at 25 through a rectifier 26 followed by a low-pass filter 26a so as to generate at 27 an approximation of the RMS value of the signal at 25. Other mechanisms could be used, such as digitally sampling the signal at 25 and performing a digital RMS estimation on it.

The signal at 27 can then be passed to the control unit 17 where it can be used in controlling the operation of the receiver. The control unit may operate largely in the digital domain, in which case it may be convenient to digitize the signal at 27 by means of an analog-to-digital converter 28 before using it further. This is not necessary if section 20 is implemented using digital processing.

The quality measure can be used in a number of ways. One notable use is in assisting the control unit to automatically vary operational parameters of the receiver with the aim of achieving a desired receive quality. The control unit may include an optimization unit 29 which adjusts operational parameters of the receiver. After an adjustment it compares the quality measure with its value prior to the adjustment, and if the quality measure indicates an improvement the adjustment is retained. Otherwise the adjustment is reversed. More sophisticated algorithms for automatic adjustment of the operating parameters could also be used. Examples of the operational parameters that could be adjusted with the aim of maximizing or at least increasing the quality measure, or with the aim of maintaining the quality measure within a desired range, are as follows:

The demodulator 3 will typically include a local oscillator which generates a signal that is mixed in the demodulator 3 with the amplified received signal to mix the received signal down to an intermediate frequency. The intermediate frequency or frequencies used in the down-conversion process can be adjusted as one or more of the said parameters.

The current consumption of receiver components, for example that of:
the low noise amplifier 2
any local oscillator(s) used in the down-conversion process that forms part of the demodulator 3
receiver analog and digital filters, where higher selectivity requires higher current consumption
receiver analog to digital converters The mono/stereo blending processing of the received audio signal, performed in unit 12. Mono reception audio quality typically resists receive signal impairments better than stereo reception. It is a known approach for receivers to reduce the amount of audio stereo separation as signal quality decreases. The amount of audio stereo separation can be one of the said parameters.

A degree of attenuation of the received audio signal, which may be applied in unit 12. When receiving very poor quality signals, even mono reception produces noisy audio. It is a known approach for receivers to attenuate the received audio as signal quality decreases, in order to limit the audio noise heard by the user.

The signal quality measure discussed above has a number of advantages over conventional techniques. First, it is simple to implement. The circuit 20 can be formed from two filters (24, 26*a*), a rectifier (26) and a peak detect circuit for amplitude detector (22). Second, it provides a relatively accurate indication of received signal quality as opposed to simply received signal strength. As indicated above, it is particularly useful in a configurable FM receiver, where parameters may be tuned with the goal of maximizing signal quality. The present signal quality measure also has the advantage that it works irrespective of whether the signal that is being received by the receiver is a mono or a stereo signal—i.e. irrespective of whether the pilot tone is present in the received signal.

The method described above is conveniently applicable to conventional broadcast FM signals. It is also applicable to other signals, especially those containing a pilot tone at a frequency such that the quality of reception of the pilot tone is representative of the quality of reception of signals at data frequencies of the protocol in question. It is conveniently applicable to systems in which the pilot tone is conventionally isolated by means of a band-pass filter from other components of the received signal, since the filter that is used to isolate the pilot signal (filter 7 in FIG. 2) can provide an output for use in the signal recovery process as well as for use by the signal quality estimator (20 in FIG. 2).

The receiver as illustrated in FIG. 2 (excluding the antenna 1 if desired) can conveniently be implemented on a single integrated circuit.

The quality measure could be used in other ways. For example, it can provide an indication allowing the receiver to decide which of two channels to receive on or to provide the input to a quality meter for providing an indication of receive quality to a user of the receiver.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

The invention claimed is:

1. A receiver comprising:
a signal quality estimator configured to estimate the quality of signal reception in the receiver, the signal quality estimator comprising:
a first filter arranged to filter a signal received by the receiver to isolate a frequency band that includes a pilot signal; and
a signal analyser configured to form an indication of the degree to which the amplitude of the signal in that frequency band varies over time, said indication serving as an estimate of the quality of signal reception in the receiver; and
a control unit arranged to adjust operational parameters of the receiver with the assistance of said estimate and to, after an adjustment of at least one of the operational parameters, compare the estimate of the quality of signal reception following the adjustment with its value prior to the adjustment and to, if the comparison does not indicate an improvement in the quality of signal reception following the adjustment, reverse the adjustment.

2. A receiver as claimed in claim 1, wherein the signal analyser comprises:
an amplitude estimator for forming an estimate of the time-variance of the amplitude of the signal in the frequency band; and
a signal estimator for forming the said indication in dependence on the magnitude of the estimate formed by the amplitude estimator.

3. A receiver as claimed in claim 2, wherein the amplitude estimator comprises:
an amplitude detector for detecting the time-variant amplitude of the signal in the frequency band; and
a second filter for filtering time-constant components from the output of the amplitude detector so as to form the estimate of the time-variance of the amplitude of the signal in the frequency band.

4. A receiver as claimed in claim 3, wherein the amplitude detector operates periodically to set the value of its output to be representative of the maximum amplitude of the signal in the frequency band during a preceding period.

5. A receiver as claimed in claim 3, wherein the amplitude detector is a peak detector.

6. A receiver as claimed in claim 3, wherein the second filter is a high-pass filter.

7. A receiver as claimed in claim 2, wherein the signal estimator is arranged to form the said indication in dependence on the average magnitude of the estimate formed by the amplitude estimator.

8. A receiver as claimed in claim 2, wherein the signal estimator comprises a rectifier followed by a low-pass filter.

9. A receiver as claimed in claim 1, wherein the frequency band includes 19 kHz.

10. A receiver as claimed in claim 1, wherein the first filter has a 3 dB bandwidth of less than 100 Hz.

11. A receiver as claimed in claim 1, wherein the receiver comprises:
a frequency demodulator for frequency demodulating a received signal to form a demodulated signal,
and wherein the first filter takes the demodulated signal as its input.

12. A receiver as claimed in claim 11, comprising a signal recovery unit for recovering a traffic signal from the demodulated signal, the signal recovery unit being arranged to recover the traffic signal by means of a pilot signal passed in the said frequency band.

13. A receiver as claimed in claim 1 wherein the control unit is arranged to adjust operational parameters of the receiver with the aim of achieving a desired signal reception quality.

14. A receiver as claimed in claim 13 wherein the control unit is arranged to adjust the operational parameters of the receiver automatically.

15. A receiver as claimed in claim 1 wherein said estimate is provided to a quality meter for providing an indication of receive quality to a user of the receiver.

16. A receiver as claimed in claim 1 wherein the receiver is arranged to receive FM broadcast signals.

17. A method for estimating the quality of signal reception in a receiver, the method comprising:
filtering a signal received by the receiver to isolate a frequency band that includes a pilot signal; and
forming a first indication of the degree to which the amplitude of the signal in that frequency band varies over time;
using said first indication as an estimate of the quality of signal reception in the receiver;
adjusting an operational parameter of the receiver;
forming a second indication of the degree to which the amplitude of the signal in that frequency band varies over time following said adjustment;
using said second indication as an estimate of the quality of signal reception in the receiver following said adjustment;
comparing the first indication with the second indication; and
reversing the adjustment if the comparison indicates that there has been no improvement in the quality of signal reception in the receiver following said adjustment.

18. A method as claimed in claim 17, wherein the step of forming an indication of the degree to which the amplitude of the signal in that frequency band varies over time comprises:
forming an estimate of the time-variance of the amplitude of the signal in the frequency band; and
forming the said indication in dependence on the magnitude of the estimate formed by the amplitude estimator.

19. A method as claimed in claim 18, wherein the step of forming an estimate of the time-variance of the amplitude of the signal in the frequency band comprises:
detecting the time-variant amplitude of the signal in the frequency band; and
filtering time-constant components from the output of the amplitude detection step so as to form the estimate of the time-variance of the amplitude of the signal in the frequency band.

20. A method as claimed in claim 19, wherein the step of detecting the time-variant amplitude of the signal in the frequency band comprises periodically setting the value the output of the amplitude detection step to be representative of the maximum amplitude of the signal in the frequency band during a preceding period.

21. A method as claimed in claim 18, comprising forming the said indication in dependence on the average magnitude of the estimate formed by the amplitude estimator.

* * * * *

UNITED STATES PATENT AND TRADEMARK OFFICE
CERTIFICATE OF CORRECTION

| | | |
|---|---|---|
| PATENT NO. | : 8,498,596 B2 | Page 1 of 1 |
| APPLICATION NO. | : 12/517640 | |
| DATED | : July 30, 2013 | |
| INVENTOR(S) | : Popescu | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 976 days.

Signed and Sealed this
Twenty-fifth Day of November, 2014

Michelle K. Lee
*Deputy Director of the United States Patent and Trademark Office*